Figure 1:
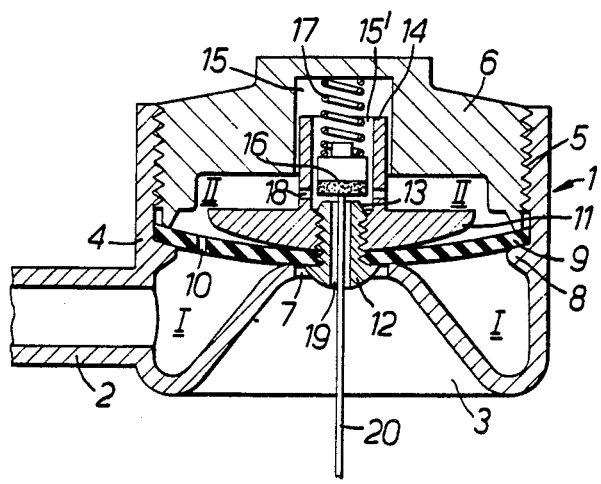

United States Patent [19]

Ottestad

[11] Patent Number: 4,534,380
[45] Date of Patent: Aug. 13, 1985

[54] GAS REGULATOR VALVE

[76] Inventor: Nils T. Ottestad, Langerekkja 73, 5260 Indre Arna, Norway

[21] Appl. No.: 467,844

[22] Filed: Feb. 18, 1983

[30] Foreign Application Priority Data

Mar. 16, 1982 [NO] Norway .................................. 820848

[51] Int. Cl.³ .............................................. F16K 31/12
[52] U.S. Cl. ..................................... 137/490; 251/44; 251/45
[58] Field of Search ....................... 128/204.26, 204.28; 137/490, 489.3; 251/44, 45

[56] References Cited

U.S. PATENT DOCUMENTS

| 2,661,601 | 12/1953 | Hart | 137/490 |
| 2,925,824 | 2/1960 | Rockwell | 137/490 |
| 3,047,001 | 7/1962 | Hosford | 137/490 |
| 3,252,698 | 5/1966 | Perrone | 137/490 |
| 3,783,891 | 1/1974 | Christianson | 128/204.26 |

FOREIGN PATENT DOCUMENTS

| 248578 | 12/1925 | United Kingdom . |
| 801748 | 4/1957 | United Kingdom . |
| 932788 | 8/1959 | United Kingdom . |
| 939702 | 3/1962 | United Kingdom . |
| 1061254 | 5/1964 | United Kingdom . |
| 1551226 | 3/1978 | United Kingdom . |

Primary Examiner—Henry J. Recla
Attorney, Agent, or Firm—Ladas & Parry

[57] ABSTRACT

A gas regulator valve comprising a housing with an inlet and an outlet and a partition wall or the like, which divides the housing into two chambers. The inlet communicates with the first chamber and with the outlet via a main valve. Between the two chambers a pressure equalizing passage for the gas is provided, and between the second chamber and the outlet a narrow channel is provided which has a valve seat facing toward the second chamber. The valve seat cooperates with an externally regulated valve body. When the valve is to be utilized in connection with a breathing valve for breathing masks, it also comprises a respiration sensor in the form of a membrane or the like. Via a link arm system or the like, the movement of the sensing membrane is transmitted to the valve body via a needle or a rod which passes through the channel.

5 Claims, 4 Drawing Figures

GAS REGULATOR VALVE

The present application relates to a gas regulator valve, comprising a housing with an inlet and an outlet and a partition wall or the like which divides the housing into two chambers, wherein the inlet communicates with a first chamber and with the outlet via a main valve.

A number of embodiments of gas regulator valves are known in the prior art. Roughly, one can differentiate between two main types: strictly mechanical valves, and valves based on utilization of the gas supply pressure to obtain a servo effect.

The purely mechanical valves have the drawback that when the gas requirement is high, the control force needed is relatively high, and this means that if such valves are utilized as breathing valves they have a high respiration resistance. The prior art servo-controlled valves are complicated and it has been difficult to make them function satisfactorily under varying conditions.

The object of the present invention is to provide a gas regulator valve which can regulate both large and small quantities of gas with very high precision and stability, and which requires only little force for its control so that the regulator can be utilized in a breathing valve which then will have very low respiration resistance (breathe easily). Another object of the invention is to provide a valve which consists of few components, and these components are subjected to small loads and little wear so that the valve will function reliably for a long period of time. Furthermore, it is an object of the invention to provide a valve which retains its good properties when the valve is of small dimensions. Finally, it is an object of the invention to provide a valve which reacts quickly in response to an external control impulse and which provides a supply of gas with minimum pulsation.

The above objects are obtained in accordance with the invention with a gas regulator valve of the type defined above, which is characterized in that a pressure equalizing passage for the gas is provided between the two chambers I and II, and that between the second chamber II and the outlet a passage is provided with a valve seat facing toward the second chamber II, said valve seat cooperating with a valve body which may be regulated externally.

A preferred embodiment of the invention is characterized in that the passage through the membrane is disposed within a sleeve or nipple which passes through and is centrally secured to the membrane, and that the valve seat is arranged in the end of the sleeve/nipple which faces toward the second chamber. In a preferred embodiment, the valve body is a plate whose position may be regulated toward and away from the valve seat by means of a rod or needle which passes through the passage in the sleeve/nipple.

In a practical embodiment, the membrane has an intrinsic tension which biases it toward the valve seat.

An embodiment which is intended for use in a breathing valve for breathing masks and which comprises a respiration sensor in the form of a membrane, is characterized in that the needle, preferably via a link arm system, cooperates with and is movable by the sensing membrane.

A modified embodiment of the invention is characterized by a hollow piston which cooperates with a valve seat and which moves in a guide in the wall between the two chambers, wherein said channel or passage passes through the piston. A further feature of this embodiment is that the piston, on the side thereof facing the chamber II, has an outwardly projecting neck, that a weak spring influences the piston in a direction toward the main valve seat, and that the piston is movable by means of said pin or needle via a driver means which acts upon the piston only after the pin or needle has forced the valve body away from the seat.

The invention will be discussed in greater detail in the following with reference to the accompanying drawings, which show various embodiments of the valve of the invention.

Figure 2:
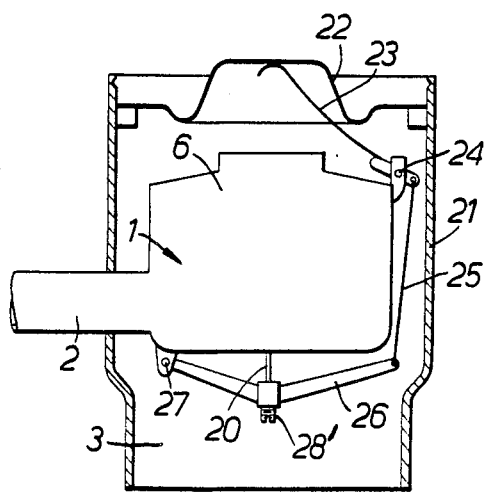
Figure 3:
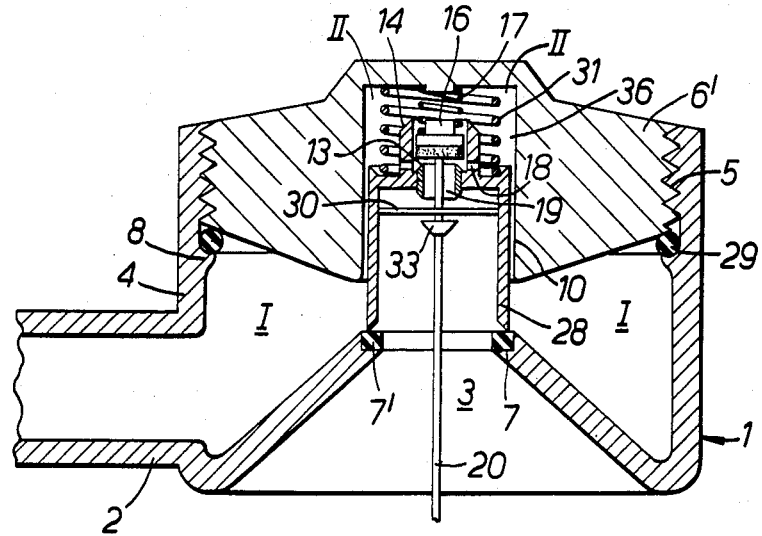
Figure 4:
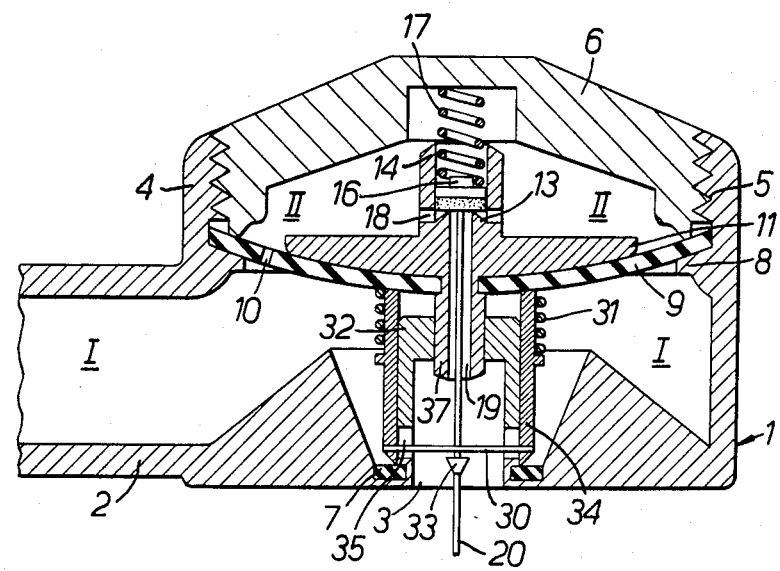

FIG. 1 is a cross section through a first embodiment of a valve in accordance with the invention, FIG. 2 schematically illustrates how the valve of FIG. 1 is controlled, when it is utilized in connection with a breathing valve, FIG. 3 is an embodiment of the invention which is especially well suited for a low gas supply pressure, and FIG. 4 is another embodiment of the valve of the invention, which is intended to function well at gas supply pressures ranging from a relatively low supply pressure up to a substantially higher supply pressure.

The valve consists of a valve housing 1 with an inlet 2 and an outlet 3. The housing consists of a case 4, which at one end has internal threads 5 for engagement with an externally threaded cap 6. At the opposite end from the internal threads 5, the case is provided with an inwardly facing value seat 7. The case 4 also has an internal annular shoulder 8, against which the edges of a membrane 9 are clamped by the screwed-in cap 6. The membrane thus divides the interior of the housing into two chambers, a first chamber I (inlet chamber) which on the figure lies as a ring on the underside of the membrane, and a second chamber II (outlet chamber) which on the figure lies on the top side of the membrane and covers substantially all of its area. A small orifice 10 is provided in the membrane for equalizing the pressure in the chambers I and II. This orifice does not necessarily have to be provided in the membrane, but can instead be provided in the housing wall. To stabilize the membrane, a pressure plate 11 is preferably vulcanized to the top side of the membrane 9. In the center of the membrane 9 is a metallic sleeve or nipple 12. This can be secured to the pressure plate 11 by means of a thread connection or in some other practical manner. The end of the sleeve or nipple 12 facing inwardly toward the chamber II is formed as a valve seat 13. On the free side of the pressure plate 11 a neck 14 is provided which passes within a guide 15 in the cap 6 of the housing. The neck has a cylindrical bore 15' and within the bore a valve body 16 is provided in the form of a plate or disc, wherein the side thereof which faces toward the valve seat 13 preferably is coated with rubber or another practical sealing material. A weak pressure spring 17 is provided above the valve body 16 which biases the valve body in a direction toward the valve seat 13. In the wall of the neck 14 one or more holes 18 are provided to provide a passage for the gas into the cavity 15' in the neck 14. The sleeve or nipple 12 has a central bore 19, and a control rod or needle 20 passes through the center of the bore 19. The rod or needle 20 is loose in relation to the valve body 16, and to ensure contact between the needle and valve body, a recess or blind bore is provided in the center of the valve body to form a bed for the rod or needle 20.

In FIG. 2, the valve is shown used in connection with a breathing valve for smokefighters, frogmen and the like. The valve is disposed within an external casing 21, and a sensing membrane 22 is provided at one end of the casing. A sensing arm 23 rests against the inside surface of the membrane, the arm 23 being rotatably mounted at 24. Via a link arm 25, the sensor is connected to a rocker arm 26, which is pivotally supported at one end at 27. The rod or needle 20 is secured at the middle of the rocker arm 26 and may be regulated by means of an adjustment screw 28'.

The valve operates in the following manner:

Gas at higher than atmospheric pressure is introduced into the valve through the inlet 2. When the valve is closed, the valve body 16 lies against the valve seat 13. The pressure in the chambers I and II is equal owing to the pressure equlization through the orifice 10. Since the pressure in the outlet 3 is lower (below atmospheric pressure), the membrane will be pressed against the valve seat 7, and no gas can pass through the valve.

When the valve is regulated and the rod 20 is moved upwardly, the valve body 16 lifts up from the valve seat 13 and gas will flow from the chamber II through the passage 19 into the outlet. The pressure then falls in the chamber II, and the membrane 9 with the pressure plate 11 and nipple 12 will be pressed upwardly. Just before the valve seat 13 reaches the valve body 16, equilibrium is obtained between the respective forces acting on the top and lower sides of the membrane 9. The balance is adjusted almost instantaneously when the dimensions of the orifice 10, passage 19 and the area of the outlet port are attuned. The throughflow opening at the outlet port is precisely regulated at all times by the position of the valve body 16.

Closure of the valve is based on the gas's own supply pressure. To open and regulate the gas flow, an external control force must be utilized which presses the valve body 16 up from the seat 13. This force is equal to the gas pressure which presses the valve body 16 downwardly toward the seat.

The membrane 9 is convexly curved toward the valve seat and has an intrinsic tension so that it will lie against the seat around the outlet port even if the gas is not connected. In this manner, one prevents the valve from leaking, once the pressure has been connected, until the pressure has built up sufficiently in the chamber II.

The breathing valve illustrated in FIG. 2 operates in the following manner:

When the user inhales, an underpressure is created which will draw the sensing membrane 22 inwardly and cause the arm 23 to rotate counterclockwise. The rod 25 will then be pulled upwardly and the rocker arm 26 will press the needle 20 upwardly and thereby lift the valve body 16, so that gas flows into the outlet port. When the user exhales, the process is reversed and the valve closes.

The invention is not restricted to the embodiment shown in the accompanying drawings and described above. Thus, the spring 17 can be eliminated if a stop means is provided which ensures that the valve body 16 cannot move more than about 0.75 mm away from the valve seat 13. Instead of regulating the valve body 16 by means of the needle 20, an adjustment screw can be mounted through the cap 6 of the housing for moving the valve body 16 toward and away from the valve seat 13.

When the supply pressure of the gas or air is low, it is no longer practical to allow the gas supply pressure to help to open the valve. It may then be preferable to replace the membrane with a piston which can be moved with very little friction in a cylinder provided between the chambers I and II. FIG. 3 shows a valve embodiment in accordance with the invention which is adapted for a low supply pressure.

The membrane which separates the chambers I and II in the embodiment described above, is in this case replaced by a specially formed cap 6'. A cylindrical bore 36 is provided in the cap which serves as a guide or cylinder for a piston 28. At the end of the piston disposed within the cylinder, a neck 14 with a cylindrical bore is formed, and within said bore a movable valve body 16 passes which cooperates with a valve seat 13. A very weak spring 17 presses the valve body 16 with gentle force toward the valve seat 13. As in the previous embodiment, the valve body 16 is controlled by means of a rod or needle 20. A pressure spring 31 bears against the piston 28, applying a force which tends to push the piston out of the cylinder 36. The lower, skirt-like edge of the piston 28 lies against the main valve seat 7, which can be provided with a ring 7' of pliable material, for example rubber. To ensure a seal between the housing 1 and the cap 6', a gasket 29 is provided. A driving stud 33 is provided on the rod 20, which cooperates with a transverse rod 30 extending crosswise within the hollow piston 28.

This valve operates in the following manner:

When the valve is closed, the valve body 16 lies against the valve seat 13. The pressure in the chambers I and II is equalized because clearance 10 is provided between the piston 28 and the wall of the cylinder 36. Since the pressure in the outlet port 3 is lower than the pressure in the chambers I and II, the piston 28 will be pressed down against the valve seat 7, and no gas passes through the valve. When the valve body 16 is lifted up from the seat 13 by means of the rod 20, the pressure in the chamber II is reduced and the piston 28 can thus be moved with a minimum of force. When the rod 20 moves further in an inward direction within the cylinder 36, the driving stud 33 will engage with the transverse rod 30 within the hollow piston 28, thereby causing the piston 28 to move further in an inward direction, so that the piston lifts up from contact with the valve seat 7. Owing to the reduced pressure in the chamber II, only very little force on the rod 20 is required to lift the piston. The gas flow in the chamber I will pass through the main valve 7 into the outlet port 3. This embodiment has been shown to have very good properties. Simulation tests have been carried out in a pressure tank, and it has been demonstrated that a supply pressure of only 0.3 bar overpressure is sufficient for a valve of this design and of reasonable dimensions to be utilized for deep-sea diving purposes. If one wishes to make a valve which breathes especially easily at a higher supply pressure, the pressure equalizing channel 10 can be reduced in size. This can be done, for example, by completely sealing the passage between the piston 28 and the cylinder wall of the cylinder 36, providing instead a small passage between the chamber I and the chamber II by means of a narrow bore in the cap 6'.

If the supply pressure is to be high, for instance 10–20 bar, the above embodiments will not be satisfactory in terms of a uniform gas throughflow, because pressure gradients will arise which can affect the throughflow openings.

An embodiment which is advantageous at high supply pressure is shown in FIG. 4. This embodiment has many features in common with the embodiment of FIG. 1, in that the housing 1 is divided into two chambers I and II by means of a membrane 9 with a pressure equalizing passage 10 and a pressure plate 11 with a neck 14. In the same way as in the embodiment of FIG. 1, a movable valve body is provided in a bore in the neck 14 which cooperates with a valve seat 13, and is pressed into contact against the seat by means of a weak pressure spring 17. The valve body 16 can be influenced by a rod 20 which moves within a narrow channel 19. The pressure plate 11 has a neck-like extension 37 which passes downwardly through the membrane into the chamber I. The neck-like extension extends within a bore in the end wall of a hollow cylinder 32, and at the opposite end, the lower edge of the cylinder skirt is secured to the valve seat 7 of the main valve between the chamber I and the outlet 3. A sliding sleeve 34 is provided on the exterior of the cylinder 32, the sleeve lying against the side of the membrane facing toward the chamber I and the other end of the sleeve facing toward the valve seat 7. A spring 31 presses the sleeve down toward the seat 7. In the same manner as in the above-described embodiment (FIG. 3), the rod 20 is provided with a driving stud 33, and a transverse rod 30 is provided within the sleeve 34. The transverse rod passes through openings 35 in the piston-shaped part 32.

When the valve is closed—that is, when no gas is flowing from the chamber I to the outlet 3—the valve body 16 lies against the valve seat 13. The membrane 9 presses against the top of the sleeve 34 and ensures a seal both between the membrane 9 and the sleeve 34 and between the valve seat 7 and the cylinder 34. When the rod 20 is forced upwardly the valve body 16 will lift up from the seat and the pressure in the chamber II will drop, and this will cause the membrane 9 to lift up from contact with the sleeve 34. When the rod 20 is moved further, the driving stud 33 in cooperation with the transverse rod 30 will pull the sleeve 34 upwardly. This movement can be obtained with a minimum of force because there is no pressure from the membrane. The gas flow is determined by the movement of the sleeve 32, since gas can penetrate past the lower part of this sleeve and pass through the openings 35 into the outlet 3. The valve is completely tight in the closed position. When the valve is in the open position, there will be a certain amount of gas leakage through the various surfaces which slide against one another, out toward the outlet 3. This gas flow, however, increases/decreases uniformly with the movement of the rod 20. The spring 31 provides a small, uniform force which presses the sleeve 34 toward the sealing surface 7.

Having described my invention, I claim:

1. A balanced gas regulator valve comprising a housing (1) having an inlet (2) and an outlet (3), partition means (6';9) dividing said housing (1) in a first (I) and a second (II) chamber, said inlet and outlet communicating with said first chamber,
   a main valve comprising said outlet defining an annular valve seat (7), valve guide means (32,36) mounted in said housing with respect to said valve seat and a cylindrical valve body (28;34) displaceably mounted relative to a guide means (36;32) in said housing (1) to move toward and away from said valve seat and having a sealing end edge at one end thereof cooperating with said valve seat (7),
   a pressure equalizing passage (10) between the two chambers (I, II),
   means for relaying the pressure in said second chamber to said cylindrical valve body to urge said valve body against said valve seat,
   a channel (19) extending between said second chamber (II) and said outlet (3),
   a control valve (13, 16) located in said channel (19) for opening and closing the channel to relieve pressure in said second chamber, and
   operating means (20) extending through said outlet (3) and being operatively connected to said control valve (13, 16) to effect opening and closing thereof,
   said cylindrical valve body (28;34) having a constant diameter which is substantially equal to the diameter of said annular valve seat (7), and
   said operating means (20) being arranged to be mechanically connected to and to move said cylindrical valve body away from said main valve seat (7) only after having opened said control valve (13, 16).

2. A valve according to claim 1, wherein said cylindrical valve body is a hollow piston (28) and said guide means is a blind bore (36) in said partition (6') wherein the piston is slidably arranged, said piston (28) being closed at the end facing away from said main valve seat (7), for defining said second chamber (II) between the piston and the bottom of the blind bore, and wherein a spring (31) is located between the piston and the bottom of the blind bore for influencing the piston in the direction towards the main valve seat.

3. A valve according to claim 2, wherein said pressure equalizing passage is constituted by a clearance (10) between the outer surface of said piston (28) and the inner wall of said blind bore (36).

4. A valve according to claim 3, wherein said control valve comprises a valve seat (13) facing said second chamber (II) and a valve body (16) cooperating with said valve seat (13), which body is connected to said operating means (20) and by means of a spring (17) is influenced in the direction towards said valve seat (13).

5. A valve according to claim 2, wherein said control valve comprises a valve seat (13) facing said second chamber (II) and a valve body (16) cooperating with said valve seat (13), which body is connected to said operating means (20) and by means of a spring (17) is influenced in the direction towards said valve seat (13).

* * * * *